United States Patent [19]

Styan et al.

[11] 3,824,549

[45] July 16, 1974

[54] OPTICAL CHARACTER RECOGNITION APPARATUS

[75] Inventors: Peter Ormonde Styan; Stuart John Mason, both of Broadstone, England

[73] Assignee: Plessey Handel Und Investments A. G., Zug, Switzerland

[22] Filed: Nov. 29, 1971

[21] Appl. No.: 206,225

[30] Foreign Application Priority Data

Nov. 30, 1970 Great Britain .................... 56871/70

[52] U.S. Cl. .................. 340/146.3 AC, 340/146.3 J

[51] Int. Cl. ............................................. G06k 9/12

[58] Field of Search ............ 340/146.3 AC, 146.3 J, 340/146.3 MA, 146.3 AC, 146.3 AE

[56] References Cited

UNITED STATES PATENTS

| | | | |
|---|---|---|---|
| 3,346,845 | 10/1967 | Fomenko | 340/146.3 AC |
| 3,407,386 | 10/1968 | Spanjersberg | 340/146.3 AC |
| 3,593,287 | 7/1971 | Kobayashi et al. | 340/146.3 J |
| 3,603,931 | 9/1971 | Britt et al. | 340/146.3 J |
| 3,651,461 | 3/1972 | Holt | 340/146.3 AC |
| 3,652,990 | 3/1972 | Darwin | 340/146.3 AC |

*Primary Examiner*—Thomas A. Robinson
*Attorney, Agent, or Firm*—Samuel Scrivener, Jr.

[57] ABSTRACT

In an arrangement for the detection of horizontal edge and vertical stroke features of characters the character is scanned in the vertical direction using at least three scan lines and three instantaneous voltages corresponding to respective horizontally aligned scan points on the scan lines are derived having a magnitude in dependence upon the relative lightness or darkness of the points. The arrangement is such that a vertical stroke will be detected when the instantaneous voltage appertaining to points on the centre scanned line exceeds or otherwise differs significantly from each of the voltages appertaining to horizontally aligned points on the other two scanned lines whereas a horizontal edge will be detected when one or more of the voltages appertaining to horizontally aligned points on the scanned lines at one instant in the scanning cycle differs significantly from corresponding voltages derived at an adjacent time instant thereby indicating a change from a relatively light to a relatively dark region or vice versa in the direction of scanning.

18 Claims, 28 Drawing Figures

OPTICAL CHARACTER RECOGNITION APPARATUS

This invention relates to the detection of the existence of difference between the respective effective quantities of electromagnetic radiation transmitted from or otherwise associated with two or more elementary regions of an electromagnetically radiant and/or irradiated object or of an image of such an object, and relates particularly but not exclusively to the detection of mutually-orthogonal features of printed or written or otherwise — formed marks, particularly but not exclusively shapes, patterns and/or configurations, which marks exhibit such mutually-orthogonal features. The invention is thus particularly but not exclusively applicable to the recognition, by opto-electrical and/or opto-electronic means, of mutually-orthognal features of certain characters in the so-called OCR (optical character-recognition) 'A' font, particularly but not exclusively the characters in that sub-set of that font which consists of the numerals 0 to 9 inclusive together with the so-called symbols: "hook", "fork", "chair", and the (variously-termed) "vertical line" or "long vertical mark".

According to one aspect of the invention there is provided a method of detecting the existence of difference between the respective effective quantities of selected electromagnetic radiation transmitted from or otherwise associated with two elementary regions of an electromagnetically radiant and/or irradiated object or of an image of such an object, the method including the step of sampling the said two quantities so as to derive two similar and respectively corresponding electric signals which have a common property which is a measurable function of the said quantities, and including the further step of comparing the electric signals so as to generate an indicative output signal in only that case where the said quantity associated with a preselected one of the two regions exceeds the said quantity associated with the other of the two regions.

Conveniently, the said common property is the magnitude of the electric signals, which may be in the form of voltages or currents or electric charges.

Conveniently, the said indicative output signal corresponds to one digit of a binary system, for example a binary '1'.

Conveniently, the indicative output signal is in electrical form.

The said radiation may be visible light, or ultra-violet and/or infra-red radiation, or gamma rays, X-radiation, microwave radiation, or radio waves.

Conveniently, the said further step of comparing the electric signals is carried out by a two-input bi-state comparator of which the two inputs are respectively supplied with the electric signals, the comparator being arranged to generate the indicative output signal (in the form of the said one digit) when the magnitude of a preselected one of the electric signals exceeds the magnitude of the other, the comparator being arranged to otherwise generate the other digit of the said binary system.

Conveniently, the same sampling is or is effectively carried out with the aid of two similar elements which are respectively arranged to respond to the said two quantities to respectively derive the said two electric signals.

In one arrangement, the said two similar elements are separate discrete elements, for example photo-electric devices which may be diodes.

In another arrangement, the said two similar elements are respectively formed by two different areas of a continuous or semi-continuous radiation-sensitive device, for example a photo-sensitive device which may comprise a surface upon which an electrical-charge distribution tends to be formed in correspondence with the said quantities of radiation associated with the said regions, the device being provided with means responsive to that distribution.

Where the one arrangement is used, conveniently, at least a part of the said radiation transmitted from or otherwise associated with a part of or the whole of the said object or the said image is arranged to be received by an array of orthogonally-arranged respectively rows and columns each of a plurality of the said separate discrete elements, whereby each such element responds to the said effective quantity of the said radiation associated with a separate corresponding said elementary region of the said object or the said image, the method including the step of scanning all of the said separate discrete elements to thereby effect the same sampling of at least one pair formed of the said two separate discrete elements.

Conveniently, the method is employed for the detection of mutually-orthogonal features of the said object or of the said image, the said orthogonally arranged respectively lines and columns of the said array being arranged to correspond directionally with the said orthogonal features.

Conveniently, the said scanning is carried out in the direction of the said columns.

Conveniently, the columns are simultaneously scanned in phase with one another.

Conveniently, a separate corresponding single output line is provided for each said column and is connected to the output of each in turn of the said separate discrete elements in that column, during the said scanning.

Where the other arrangement is used, conveniently, at least a part of the said radiation transmitted from or otherwise associated with a part of or the whole of the said object or the said image is arranged to be received by the said radiation-sensitive device, whereby each different area of that device responds to the said effective quantity of the said radiation associated with a separate corresponding said elementary region of the said object or the said image, the method including the step of scanning all of the said different areas to thereby effect the said sampling of at least one pair formed of the said two separate areas.

Conveniently, the method is employed for the detection of mutually-orthogonal features of the said object or of the said image, the said scanning being carried out in one of the two orthogonal directions of those features.

Conveniently, the said scanning is a repetitive sequential line-by-line scanning of the radiation-sensitive device, and wherein a separate corresponding single output line is provided for each such scanning line.

In one application, the method is employed for the recognition of a "vertical edge" feature and/or a "vertical stroke" feature.

Conveniently, the "vertical edge" feature is recognised by the existence of the same said indicative output signal in respect of a continuous or semi-continuous sequence of at least two different sets each of two said elementary regions which are adjoint, which sequence extends along the direction of the said scanning.

Conveniently, the "vertical edge" feature is alternatively recognised by the existence of the same said indicative output signal in respect of a continuous or semi-continuous sequence of at least two different sets each of two said elementary regions which are separated from one another in the direction of the said scanning, which sequence extends along the direction of the said scanning.

Conveniently, the "vertical edge" feature is alternatively recognised by the existence of the same said indicative output signal in respect of a continuous or semi-continuous sequence of at least two different sets each of two said elementary regions which are separated from one another in the transverse direction perpendicular to the direction of the said scanning and which are either aligned along that transverse direction and are or are not also separated from one another in the direction of the said scanning, which sequence or sequences extends or extend along the direction of the said scanning, the said separation from one another being approximately equal to twice the width of each said elementary region.

Alternatively, the "vertical edge" feature is recognised by the existence of the same said indicative output signal in respect of either one or both of two continuous or semi-continuous sequences each of at least two different sets each of two said elementary regions, the two sequences extending co-extensively along the direction of the said scanning such that each said set of the one sequence is aligned in the transverse direction perpendicular to the direction of the said scanning with a separate corresponding said set of the other sequence and has a said elementary region which also constitutes a said elementary region of that other sequence.

Conveniently, the "vertical stroke" feature is recognised by the existence of the same said indicative output signal in respect of both of the said two sequences described in the preceding paragraph.

In a further application, the method is employed for the recognition of a "horizontal edge" feature and/or a "horizontal stroke feature.

Conveniently, the "horizontal edge" feature is recognised by the existence of the said indicative output signal in respect of at least one set of two said elementary regions of which regions one is selected from a first and the other from a second sequence of three such regions, the first and the second sequences extending co-extensively in the transverse direction perpendicular to the direction of the said scanning whereby each of the said three regions of the first sequence either adjoins a separate corresponding one of the said three regions of the second sequence or is separated therefrom by a similar distance in the direction of the said scanning.

Conveniently, the "horizontal stroke" feature is recognised by the existence of the said indicative output signal in respect of at least one set of two said elementary regions of which regions one is selected from a first and the other from either a second or a third seqence of three such regions, the first sequence being arranged between the second and the third sequences with respect to the direction of the said scanning, and the first and the second and the third sequences extending co-extensively in the transverse direction perpendicular to the direction of the said scanning whereby each of the said three regions of the first sequence either adjoins at its opposite sides respectively a separate corresponding one of the said three regions of the second sequence and a separate corresponding one of the said three regions of the third sequence or is separated therefrom by similar distances respectively in the direction of, and in the direction opposite to the direction of, the said scanning.

The invention also includes apparatus corresponding to the method of the preceding paragraphs.

The following apparatus may be used, according to the invention, for recognising a "vertical edge" feature.

In one arrangement, the apparatus includes the said array having at least five columns each provided with a said separate corresponding single output line, and including the said two-input bi-state comparator having its two inputs respectively connected to two of the output lines which lines correspond to adjacent columns of the array.

In another arrangement, the apparatus includes the said array having at least five columns each provided with a said separate corresponding single output line, and including two of the said two-input bi-state comparators, one input of each of the comparators being directly connected to one of the output lines, and the other inputs of the comparator being connected to another of the output lines respectively directly and via a time-delay circuit, the said one and other output lines corresponding to adjacent columns of the array, and the said time-delay being equal to or a multiple of the time interval between the said scanning of adjacent rows of the array.

In another arrangement, the apparatus includes the said array having at least five columns each provided with a said separate corresponding single output line, and including four of the said two-input bi-state comparators, one input of each of the comparators being directly connected to a first one of the output lines, the other inputs of the two of the comparators being connected to a second one of the output lines respectively directly and via a time-delay circuit, and the other inputs of the remaining two comparators being connected to a third one of the output lines respectively directly and via another equal time-delay circuit, the said first, second and third ones of the output lines corresponding respectively to the sequentially first, second and fourth columns of the array (counting from either side of the array), and the said time-delay being equal to or a multiple of the time-interval between the said scanning of adjacent rows of the array.

In another arrangement, the apparatus includes the said array having at least five columns each provided with a said separate corresponding single output line, and including two of the said two-input bi-state comparators, one input of each of the comparators being directly connected to a first one of the output lines, and the other inputs of the two comparators being respectively directly connected to a second one and a third one of the output lines, the said second, first and third ones of the output lines correspondingly respectively to a sequence of three next-adjacent columns of the array.

In these arrangements, conveniently, the output of each of the comparators is delivered to a separate corresponding input of an inclusive — OR gate or of an exclusive — OR gate.

The apparatus of the last of the arrangements may be modified to recognise a "vertical stroke" feature, the output of each of the comparators being delivered to a separate corresponding input of an AND gate.

The output of the comparator of the said one arrangement, or the output of the gate in the other arrangement, is (conveniently) delivered to an integrating circuit.

Conveniently, the output of the integrating circuit, and a control signal, are respectively delivered to the two inputs of an auxiliary two-input bi-state comparator arranged to generate a recognition signal when the magnitude of the said output lies in a predetermined relation to the magnitude of the said control signal.

Conveniently, the input to the integrating circuit is also supplied to detecting means responsive to the time-interval for which the electric signal appearing at that input does not correspond to the said indicative output signal or signals, the detecting means being arranged to automatically restore the integrating circuit to its zero condition when the said time-interval exceeds a predetermined value.

Apparatus for recognising a "horizontal edge" feature may include the said array having at least five columns each provided with a said separate corresponding single output line, and including three of the said two-input bi-state comparators, one input of each of the comparators being connected to a common line arranged to receive the output of a minimum-signal-following device having three inputs which are respectively connected to a first, second and third one of the output lines, the other input of each of the comparators being connected to the output of a separate corresponding maximum-signal-following device having two inputs, the inputs of each maximum-signal-following device being respectively connected to a different pair of the first, second and third ones of the output lines, those lines corresponding respectively to a sequence of three next-adjacent columns of the array, and the arrangement including at least one time-delay circuit so arranged that the signals appearing at the said one inputs of the comparators, as compared with the signals appearing at the said other inputs of the comparators or vice versa, have been relatively delayed by a time which is equal to or multiple of the time interval between the said scanning of adjacent rows of the array.

Apparatus for recognising a "horizontal stroke" feature may include the said array having at least five columns each provided with a said separate corresponding single output line, and including three of the said two-input bi-state comparators, one input of each of the comparators being connected to a common line arranged to receive the output of a minimum-signal-following device having three inputs which are respectively connected to a first, second and third ones of the output lines, the other input of each of the comparators being connected to the output of a separate corresponding maximum-signal-following device having two inputs, the one inputs of each maximum-signal-following device being directly connected respectively to the first, second and third ones of the output lines and the other inputs thereof being connected respectively to the first, second and third ones of the output lines by way of separate corresponding and equal first time-delay circuits, the said ones of the lines corresponding respectively to a sequence of three next-adjacent columns of the array, and the arrangement including at least one second time-delay circuit arranged to delay the output of the minimum-signal-following device, the time delay introduced by the second time-delay circuit being equal to or a multiple of the time interval between the said scanning of adjacent rows of the array, and the time delay introduced by the first time-delay circuits being twice that of the second time-delay circuit.

The invention may be put into practice in a number of ways, but one specific embodiment and a number of modifications thereof will now be described with reference to the accompanying drawings of which:

Figures 4A, 4B, 5A, 5B, 5C:
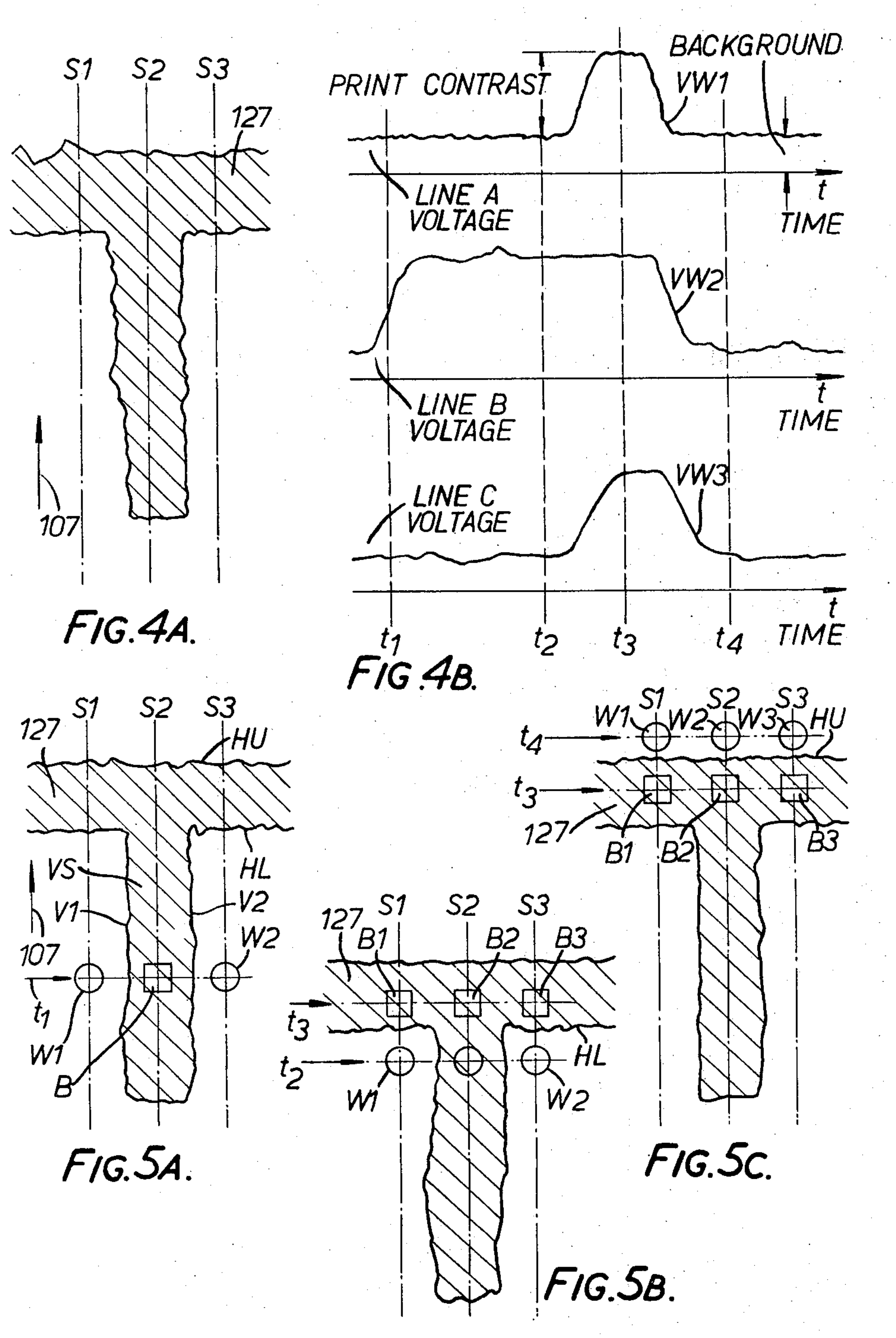
Figures 6A, 6B, 6C, 6D, 6E:
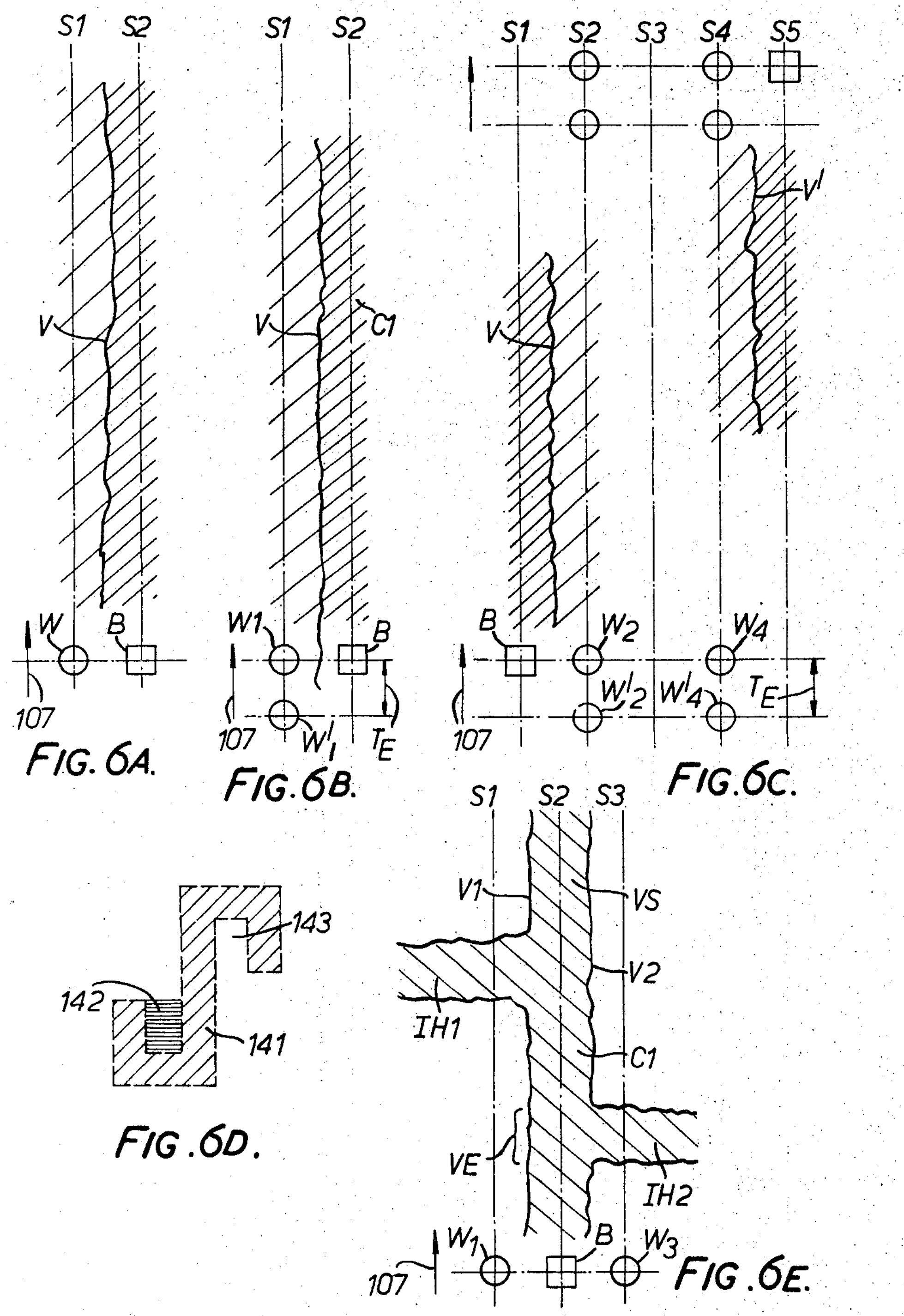
Figures 7A, 7B:
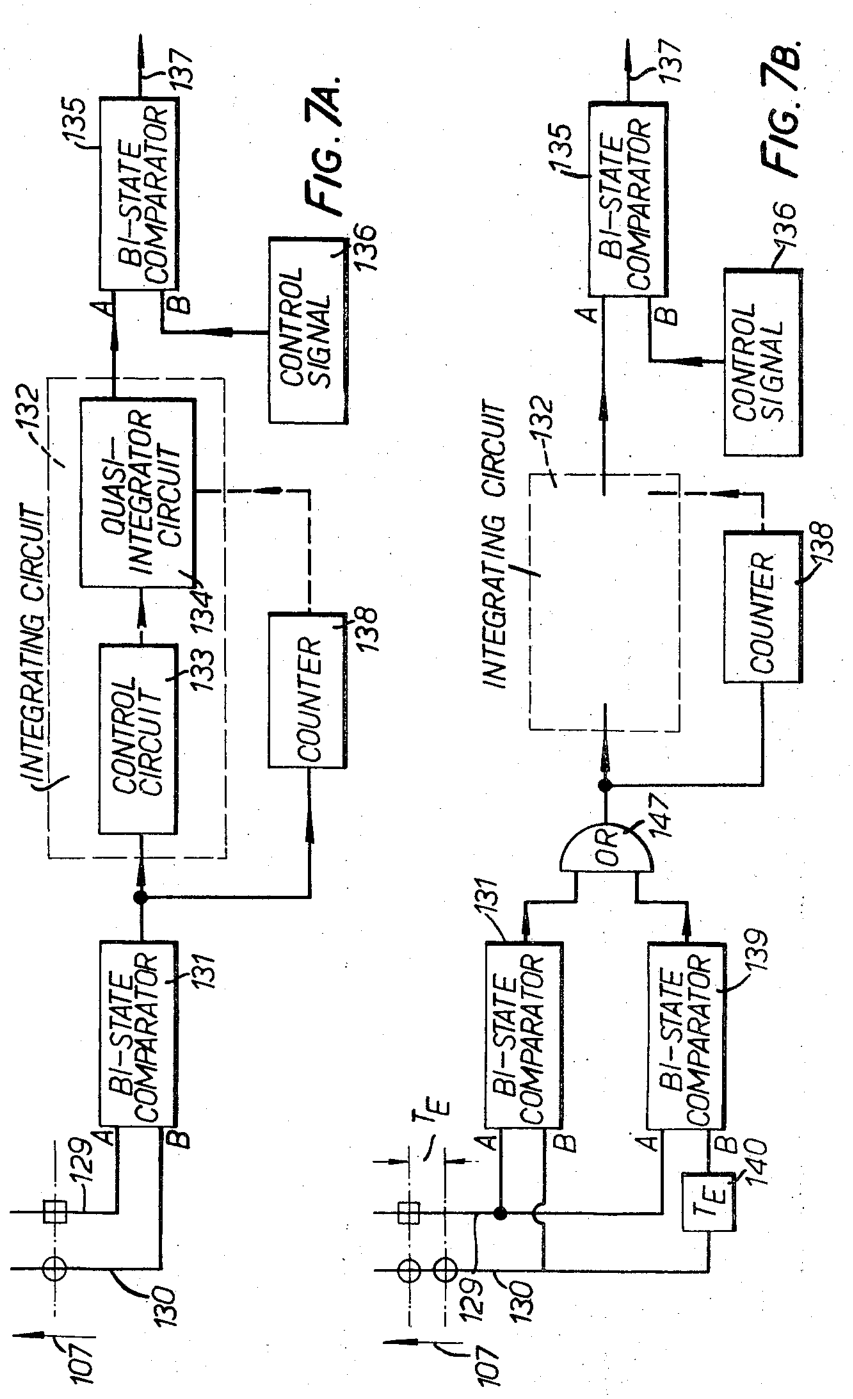
Figure 7C:
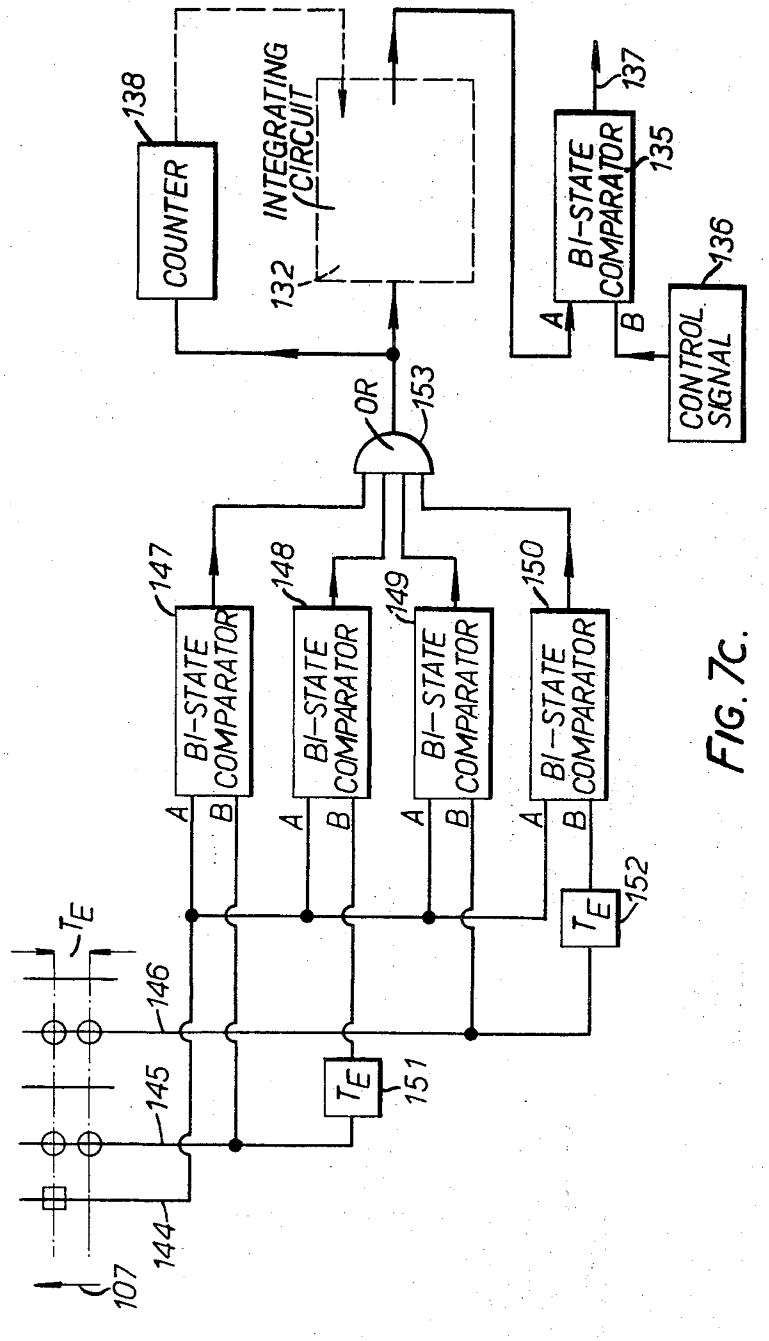
Figures 7D, 7E:
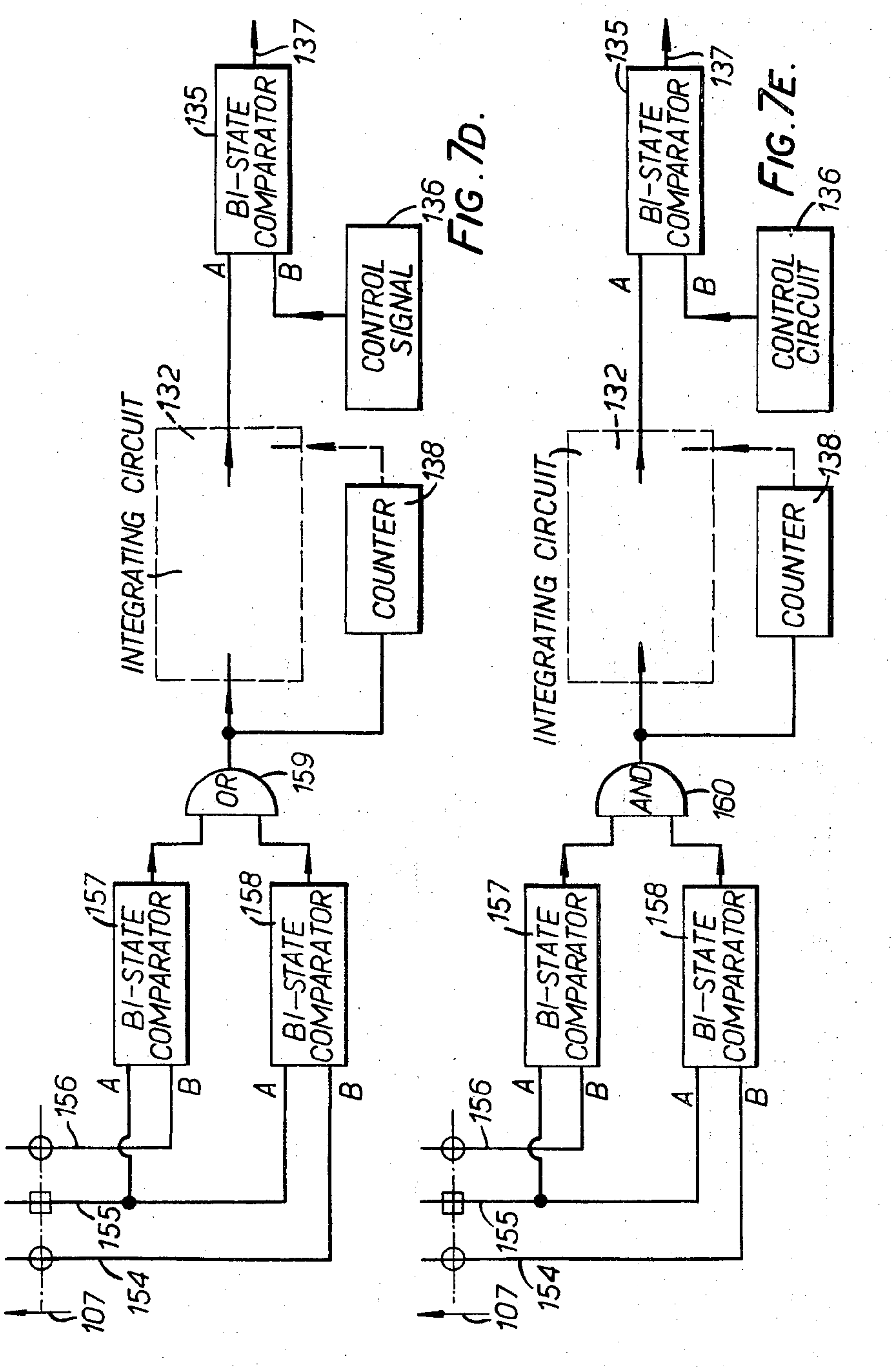
Figure 8A:
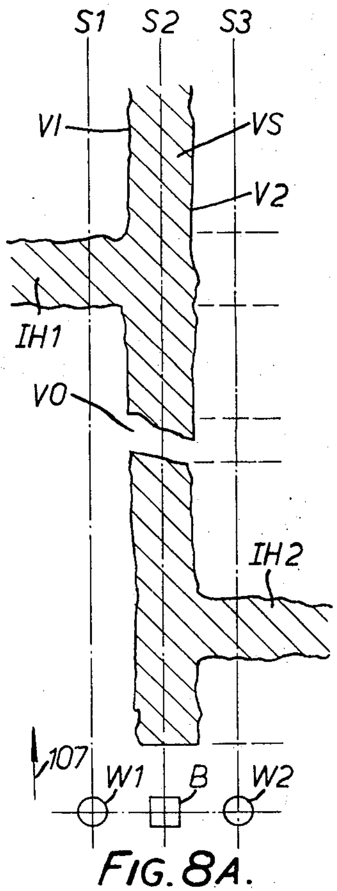
Figure 9A:
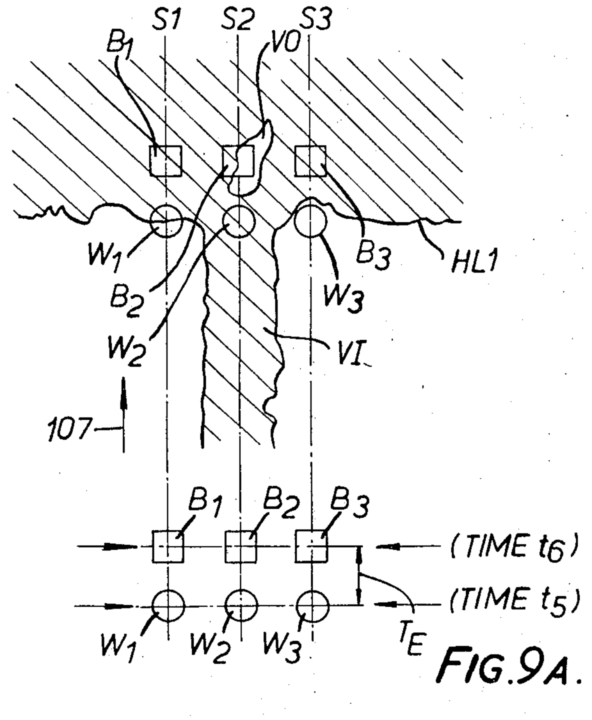
Figure 10A:
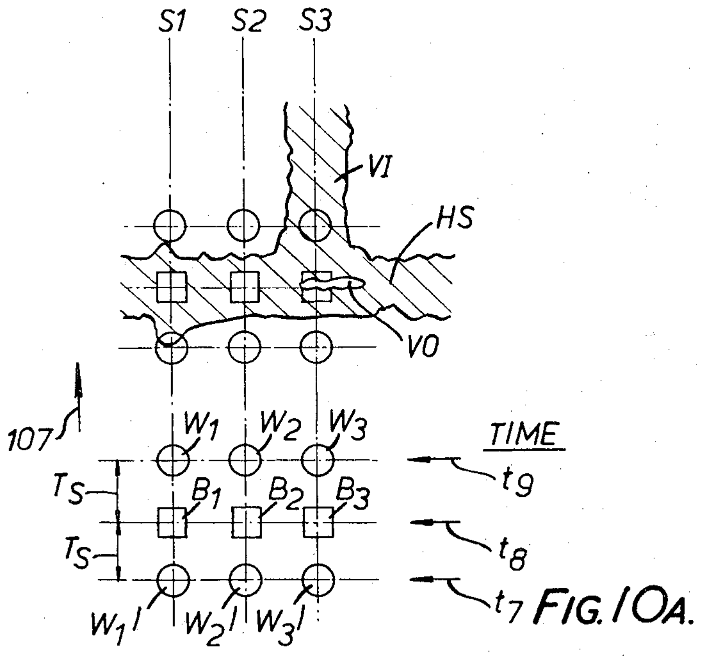
Figures 9B, 9C:
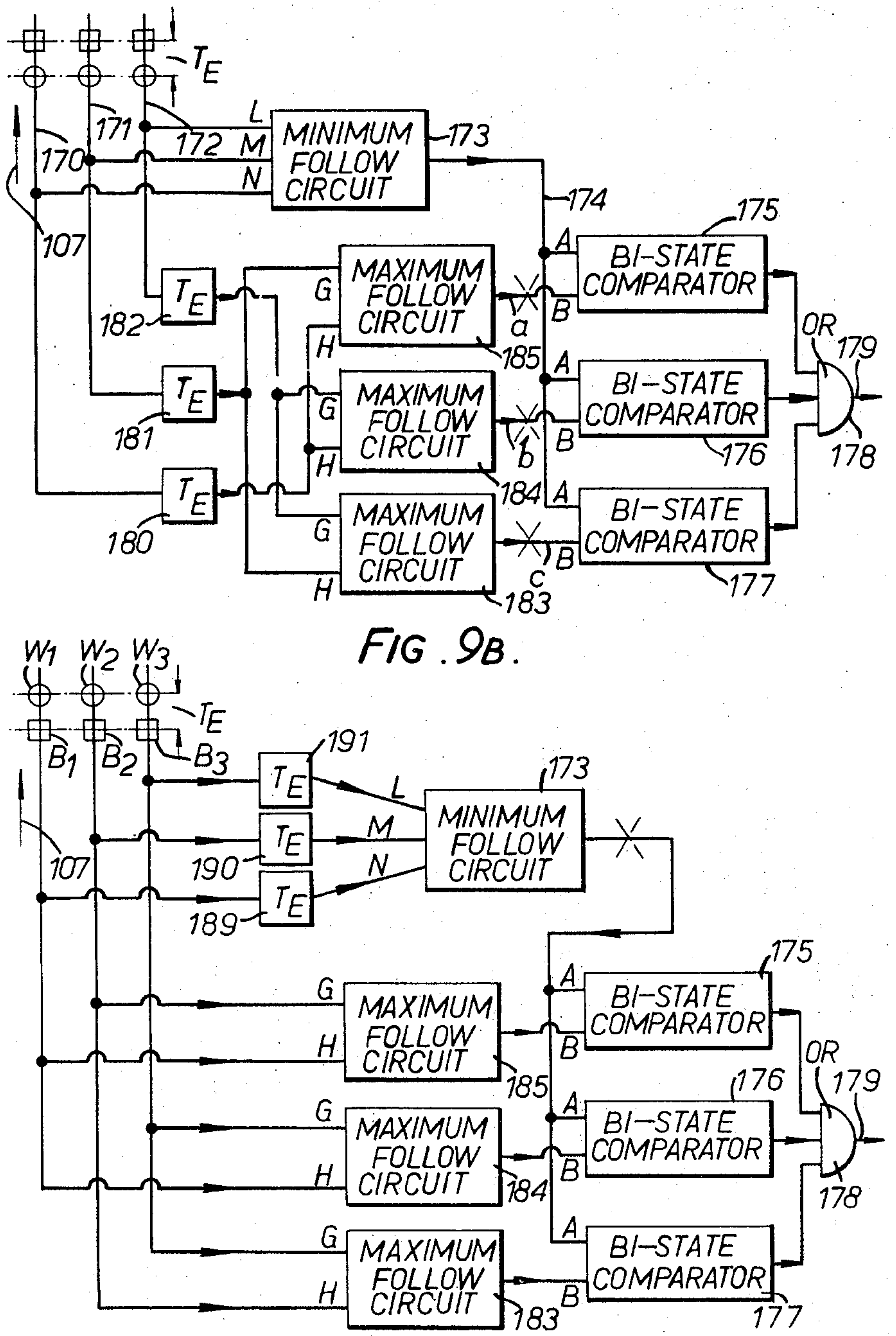
Figures 10B, 10C:
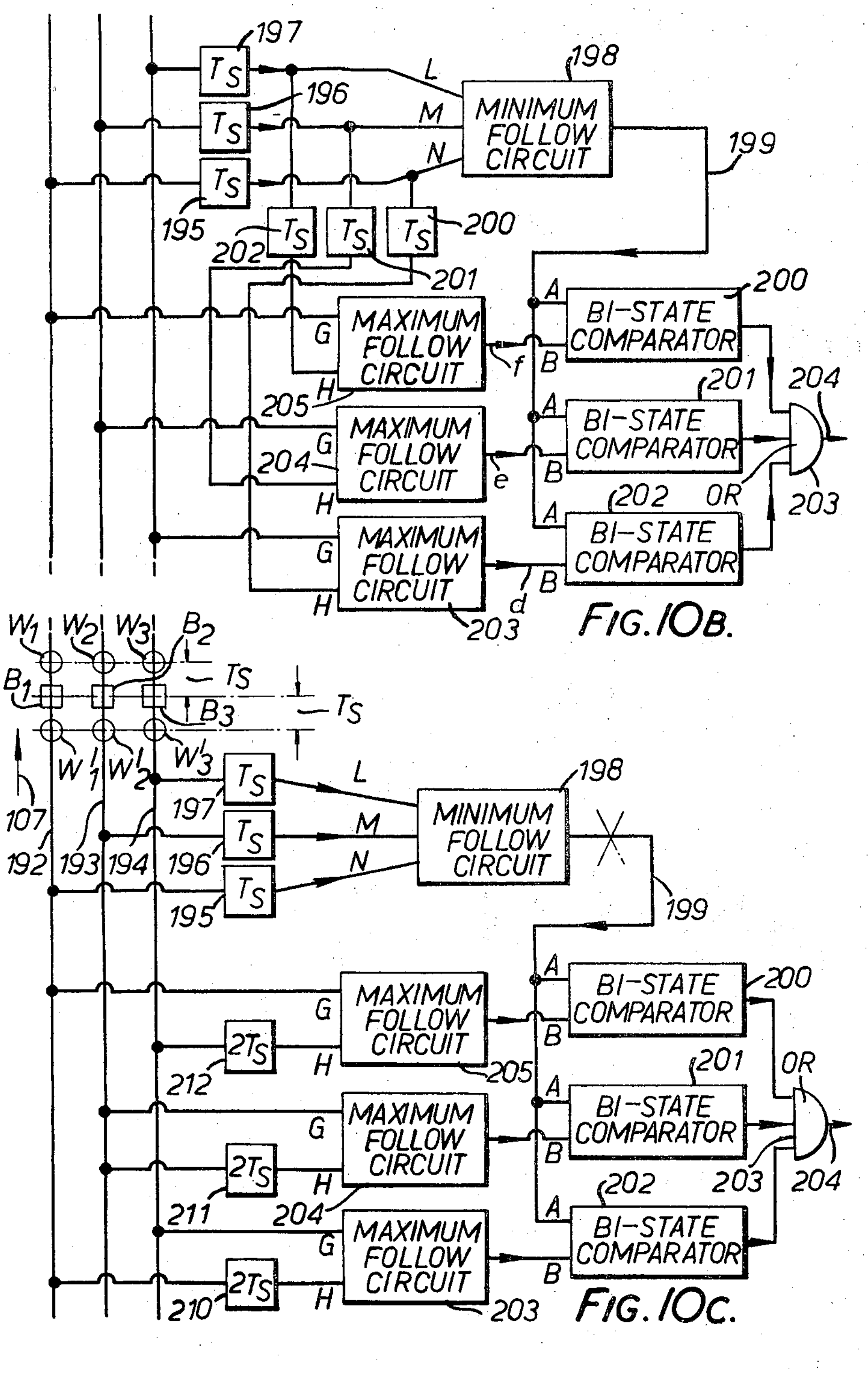

FIGS.4(A) and 4(B) are diagrams which further illustrate the operation of the apparatus of FIG.2;

FIGS.5(A), (B) and (C) are diagrams which illustrate certain useful theoretical concepts of the operation of apparatus according to the invention;

FIGS.6(A), (B) and (C) are diagrams which illustrate the use of the invention to recognise so-called "vertical edges", FIG.6(D) being an explanatory diagram;

FIG.6(E) is similar to FIGS.6(A), (B) and (C) but relates to the recognition of a so-called "vertical stroke";

FIGS.7(A) – (E) inclusive are block circuit-diagrams of apparatus according to the invention, for rcognising "vertical edges and/or strokes";

FIGS.8(A), (B) and (C) are respectively an explanatory diagram, a graph, and a block circuit-diagram, of integrating apparatus which is preferably associated with the apparatus of FIGS. 7(A) – (E) inclusive;

FIG.9(A) is a diagram which illustrates the use of the invention to recognise so-called "horizontal edges", and FIGS.9(B) and 9(C) are block circuit-diagrams of apparatus for this purpose, and FIG.10(A) is a diagram which illustrates the use of the invention to recognise so-called "horizontal-strokes", FIGS.10(B) and 10(C) being block circuit-diagrams of apparatus for this purpose.

Figure 1:
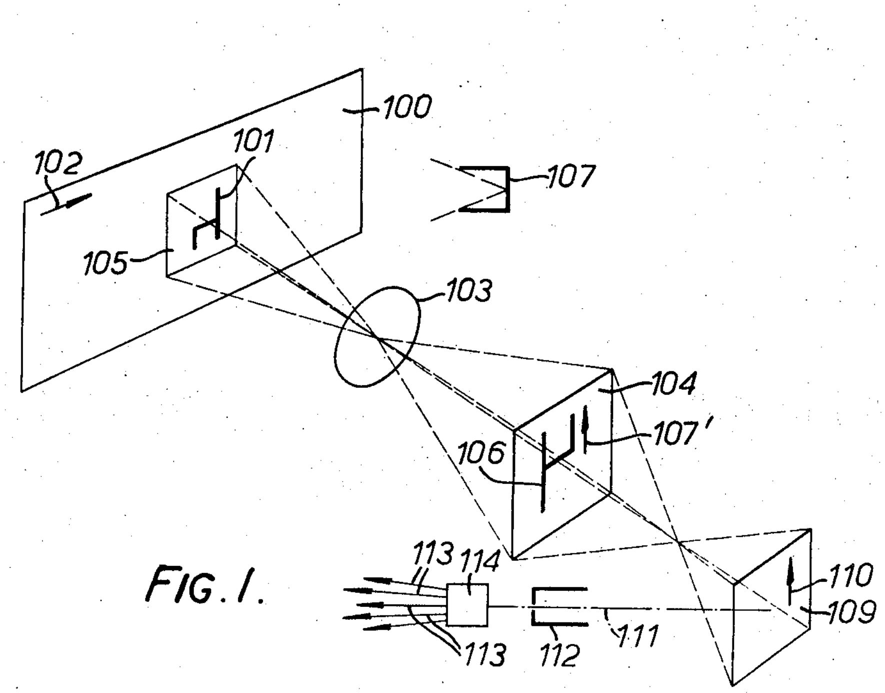
FIG. 1 is an incomplete explanatory view of the general arrangement of one form of apparatus according to the invention.

Referring to FIG.1, the reference numeral 100 indicates a thing, for example a sheet of paper, which carries a character 101 indicated as the so-called "chair" symbol of that sub-set of the OCR 'A' font which consists of the numerals 0 to 9 inclusive together with the so-called symbols; "hook", "fork", "chair", and the (variously-termed) "vertical line" or "long vertical mark".

The thing 100 may be stationary, or it may be continuously or semi-continuously moved (for example in the direction of the arrow 102), for example with the aid of a rotating-drum transporting machine (not shown) or with the aid of rollers (not shown).

An optical system (indicated schematically by the lens 103) is arranged to project on to an image-receiving surface 104, an image of an area 105 of the thing 100, whereby an image 106 of the character 101 is projected on to the surface 104. For this purpose, the area 105 may be front-illuminated (as by a lamp 107) or may be rear-illuminated where applicable. (The invention is also applicable to the case where the (object) area 105, or a part of it, is a source of light, furthermore, the light need not be visible light but may be infra-red or ultra-violet light; moreover, the invention is applicable to other forms of electromagnetic radiation, e.g. gamma rays, X-radiation, microwave radiation, and radio waves: appropriate and generally-known modifications to the arrangements of FIG.1 will be made in such other cases.)

In the arrangement indicated in FIG. 1, the surface 104 may be a continuous or semi-continuous radiation-sensitive device, e.g. a photo-sensitive device upon which an electrical-charge distribution is formed in correspondence with the optical image, formed upon the surface 104, of the (object) area 105. This charge distribution is scanned in generally-known manner, and in the direction of the arrow 107'. Thus, for example, in one generally known arrangement, electrons emitted by the surface 104 are focussed (by means not shown) on to a sensitised plate 109 which is scanned (in the direction of the arrow 110) by an electron-beam 111 from a gun 112; the output signal 113 from the gun is developed in an electric circuit indicated at 114, and the arrangement is such that the multiple (see below) output signals 113 are analogue signals of which the magnitudes represent, as functions which vary with time, the apparent intensity or brightness of portions of the image formed upon the surface 104 (as a function of distance over that surface 104). In order to sample the surface 104, generally-known apparatus such as a videcon arrangement or a flying-spot scanner arrangement, may be used.

The frequency of the scanning of the surface 104 is preferably a video-frequency, for example 5MHz.

The apparatus being described is particularly but not exclusively applicable to the detection and recognition of mutually-orthogonal features of printed or written or otherwise formed marks, particularly but not exclusively shapes, patterns and/or configurations, which marks exhibit such mutually-orthogonal features. Such marks include certain characters of the OCR 'A' font, particularly but not exclusively the sub-set of characters referred to above. The said certain characters may be conveniently visualised as having such features in the form of "vertical edges", "vertical strokes", "horizontal edges", and "horizontal strokes", which features will be illustrated below.

Where the said mutually-orthogonal features occur (as, for example, the "vertical" and the "horizontal" limbs of the "chair" symbol 101 of FIG.1), the scanning of the image-receiving surface 104 is preferably arranged to be in one of the two orthogonal directions of those features (e.g. in FIG.1, the direction 107 of the scanning is parallel to the "vertical" limbs of the image 106 of the "chair" symbol 101).

Figure 2A:
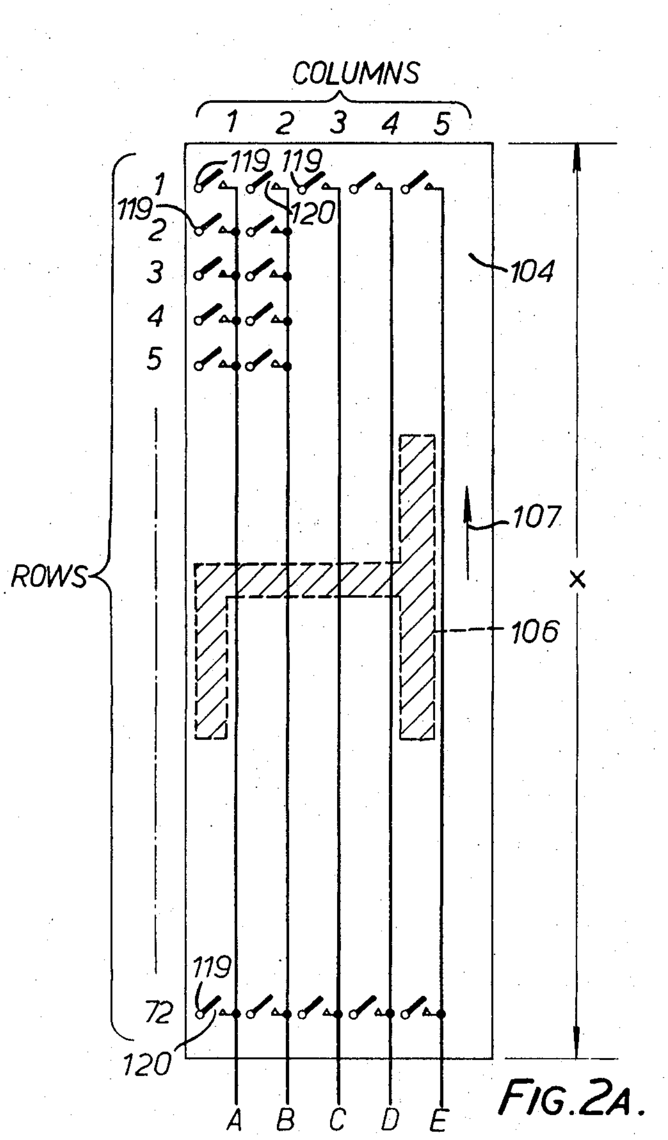
FIG. 2(A) is a schematic plan-view of a preferred form of image-responsive surface for use in a preferred modification of the apparatus of FIG.1, FIG.2(B) being an incomplete plan view of the actual arrangement of that surface.

Whereas the above-described arrangement may be employed, we prefer instead to employ the modified arrangement next to be described. Referring to FIG.-2(A), in this case the image-receiving surface 104 has the form of an array of orthogonally arranged respectively lines and columns each of a plurality of radiation-responsive separate discrete elements indicated (schematically) at 119. In the optical case, the elements 119 may be photo-electric devices, for example diodes.

In the case of the OCR 'A' font, the characters may be regarded as based upon "horizontal" and "vertical" limbs arranged according to a 13-line OCR 'A' grid. In such case, there are preferably at least five of the said columns (seven columns may be used with advantage, in certain cases), which columns are "vertical", i.e. the columns extend (as indicated in FIG.2(A))parallel to the "vertical" direction of a character such as the "chair" symbol 106. As regards the said rows, these are orthogonal with the said columns; moreover, it is generally accepted that the physical extent of the rows (the distance X in FIG.2(A)) should be equal to three character-heights. The distance X may include 72 of the diodes 119, so that there are 72 rows of the array.

In this description of the invention, it will be assumed for convenience that the marks to be detected are black and are upon a white background. However, as will be seen, the invention basically depends upon the detection of difference between the respective effective quantities of electromagnetic radiation transmitted from or otherwise associated with at least one set of two elementary regions of an object or of an image of that object, and "black" and "white" are to be interpreted accordingly where appropriate.

Referring to FIG.2(A), the output signal from each diode 119 of any given column can be sampled by closing a normally-open switching-device 120 which is associated with that diode, so supplying the output signal from that diode to a common sampling line. There are thus five such sampling lines, A, B, C, D and E.

It will be understood that where the elements 119 are photo-electric devices such as diodes, they may be arranged (when sampled) to supply an electric output signal, for example in the form of voltage or current or electric charge, of which the magnitude is a function of the relevant optical radiation received by that diode as a result of its sampling of the relevant part of the image formed upon the image-receiving surface 104. In the present case, for convenience of description, it will be assumed that this electric output signal has the form of an electric voltage of which the magnitude is relatively high for "black" (i.e. relatively little radiation detected) and relatively low for "white" (i.e. relatively much radiation detected).

Figure 2B:
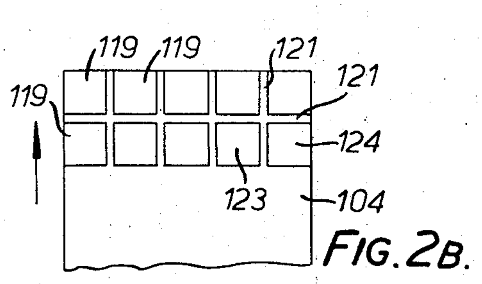

It is to be understood that the elements 119 are only indicated schematically in FIG.2(A). In fact, the elements 119 may be rectangular and arranged closely together such that the distances 121 between them are relatively very small, as indicated in FIG.2(B). It will be understood that, since the elements 119 effectively form the image-receiving surface 104 upon which the image 106 is formed, thus the elements of a pair of the elements, such as 123 and 124 (FIG.2(B)), are respectively effectively associated with two elementary regions of that image (and thereby, also, with the two corresponding elementary regions of the object 101 from which that image 106 was formed). In the case being described, the surface 104 may be an integrated-circuit silicon chip, upon which the elements 119 are formed.

Figure 3:
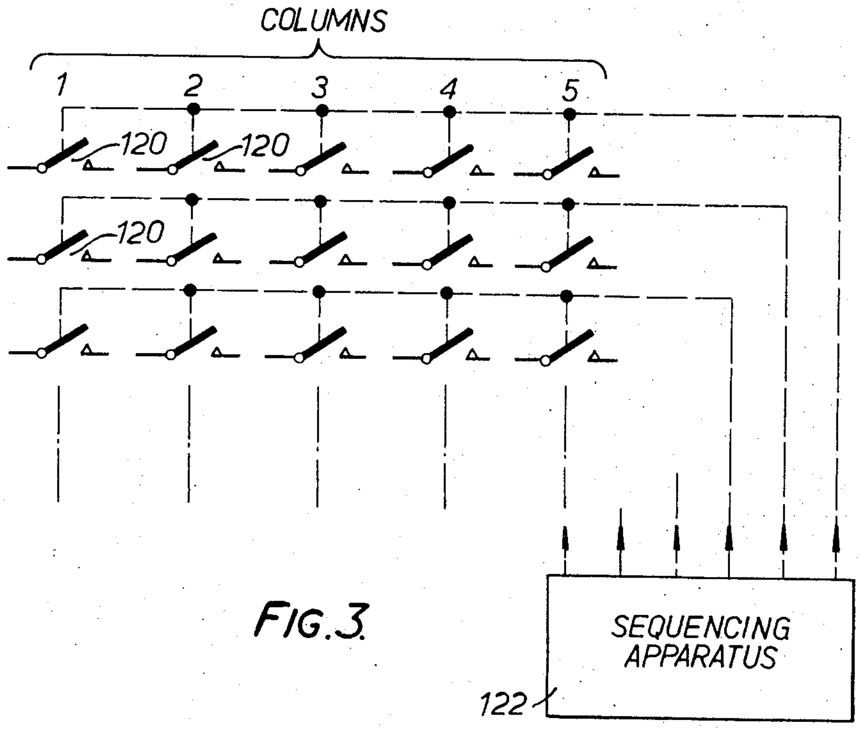
FIG.3 is an incomplete schematic circuit-diagram which illustrates the operation of the apparatus of FIG.2.

Referring to FIG.3, the switching devices 120 of any one column are arranged to be closed sequentially and repetitively, to effect the scanning and the sampling of the associated elements 119. All five columns are simultaneously scanned in phase. The scanning is thus effected at the video frequency and in generally known manner, by sequencing apparatus indicated at 122, the five switching devices 120 in each row being effectively "ganged together". Conveniently, the devices 120 may be semiconductor-type analogue-switches in the form of field-effect transistors.

Referring to FIG.4(A), 127 represents a "black" feature of an image projected upon the image-receiving surface 104 (FIGS.1, 2), the image being assumed to be upon a "white" background. The feature 127 is scanned (as described above) along the three chain-lines S1, S2 and S3, i.e. those lines correspond respectively to any three adjacent columns of the array (FIGS. 2(A)); assuming that the columns in question are 1, 2 and 3 (FIG. 2(A)), then the relevant three sampling lines are A, B and C (FIG.2(A)).

In such case, the analogue-type voltage signals appearing the lines A, B and C may have the respective forms VW1, VW2 and VW3 indicated in FIG.4(B), where the higher-voltage portions correspond (see above) to "black" and the lower-voltage portions to "white".

Referring to FIG.5(A), suppose at the time $t_1$ (FIG.4(B)), the character-feature 127 is being scanned at the position shown (upon the surface 104), i.e. suppose that $W_1$, B and $W_2$ represent that particular trio of the elements 119 (FIG.2) of the columns 1, 2 and 3 that are then being sampled over the sampling lines A, B and C respectively. Inspecting FIG.4(B), it will be seen that $W_1$, B and $W_2$ respectively indicate "white", "less white" (i.e. a condition intermediate "black" and "white"), and "white". This state of affairs is thus indicated by FIG.5(A), where B is sensing the intermediate condition.

The preceding paragraph properly describes the state of affairs at the time $t_1$. For convenience, although $W_1$, B and $W_2$ (FIG.5(A)) properly represent the said trio of elements 119, it is convenient to refer to them, in a particular context, as either "black-seeking points" or "white-seeking points" which are respectively represented as a small square and as a circle. This notation is convenient because here the invention is essentially concerned with the directional sensing of the difference between quantities of radiation, i.e. a transition from "white" to "black" is to be distinguished from a transition from "black" to "white"; furthermore, the notation emphasises that the invention is not limited to the particular arrangements described.

Thus, in the case of FIG.5(A) it is assumed that a "vertical stroke" VS is to be detected; this is done (see below) by the simultaneous detection of the two "vertical edges" V1 and V2, and corresponds to the simultaneous indication by the said trio of elements 119 of "white", "black" and "white" respectively. Hence, those three elements are regarded, in the notation and when a "vertical stroke" is being sought, as respectively "white-seeking", "black-seeking" and "white-seeking" "points".

Similarly, FIG.5(B) relates to the detection of the "lower" "horizontal edge" HL of a "horizontal stroke", which detection might be effected by comparing the voltage signals upon the lines A and C (FIG.4(B)) at time $t_2$ with the voltage signals upon the lines A, B and C (FIG.4(B)) at the later time $t_3$. If ($t_3 - t_2$) is suitably selected, then the presence of that "horizontal edge" is detected by occurrence of the voltage signals referred to in the preceding sentence.

Correspondingly, in the notation (FIG.5(B)), two "white-seeking points" W1 and W2 are indicated at the time $t_2$, and three "black-seeking points" at the time $t_3$.

Similarly, FIG.5(C)) relates to the detection of the "upper" "horizontal edge" HU of a "horizontal stroke". This corresponds, in the notation, to three "black-seeking points" B1, B2 and B3 indicated at the time $t_3$ and three "white-seeking points" W1, W2 and W3 indicated at the time $t_4$. (The voltage conditions at the times $t_3$ and $t_4$ can be established from FIG.4(B)).

Referring now to FIG.6(A), the "vertical edge" V is located between the scanning lines $S_1$ and $S_2$, the region to the left-hand side in the Figure being part-shaded to indicate that it is less "white" than "white" (i.e. intermediate "white" and "black"), and the other region being "black". This "vertical edge" can be detected, according to the invention if, over a given time, the voltage output from the "black-seeking point" B exceeds the voltage output from the "white-seeking point" W. The circuit for this detection is indicated in FIG.7(A): any two adjacent ones of the sampling lines A, B, C, D and E (FIG. 2(A)) are connected respectively to two input lines 129, 130. The latter lines which (as indicated in FIG. 7(A)) respectively correspond to the "black-seeking" B and "white-seeking" W "points" are respectively connected to the two inputs of a bi-state comparator 131 to respectively provide input signals A and B: the comparator provides a digital-form electric output signal according to the following truth-table:

| Input Signals | Output Signals |
|---|---|
| If A>B | binary 1 |
| If A≤B | binary 0 |

The binary '1' output signal is thus the said indicative output signal, indicating that the points B and W have co-operated to detect a transition from "black" to "white" in the relevant directional sense.

(The comparator 131 is of generally-known form).

It will be understood that the presence at the output of the comparator 131, of a binary '1' output-signal does not necessarily indicate the detection of a "vertical edge" unless that signal persists for a sufficient time (whereupon a "vertical-edge" feature is defined as having been detected). Thus, the output of the comparator 131 is supplied to an integrating circuit indicated at 132; this circuit may have any suitable form, but, conveniently, the said output is supplied to a(generally known) control circuit 133, which, so long as it receives the binary '1' output-signal, causes the operation of a quasi-integrating circuit 134 to continue: the analogue-form voltage output of the circuit 134 is supplied to the 'A' input of an auxiliary two-input bi-state comparator 135 of which the 'B' input is connected to a control-signal circuit 136. The circuit 136 supplies a constant voltage, the magnitude of which is adjustable as required to define what constitutes a "vertical edge". Thus, the comparator 135 operates similarly to the comparator 131 (the terms 'A' input and 'B' input refer to the above truth-table) and provides a binary '1' output signal over its output line 137 when the rising voltage at its input 'A' exceeds the constant voltage at its input 'B'. The presence of this binary '1' output signal on the line 137 indicates that a "vertical edge" has been detected and recognised as such, and the output line 137 may be connected to character-recognition apparatus of generally known form, wherein a character is recognised by the detection and recognition of a combination of similar or different character-features of that character.

The output of the comparator 131 is also supplied to the input of a counter 138. The counter responds to the time for which a binary '0' signal persists at its input and, if that time is excessively large (for example, equal to the time taken by the scanning apparatus to scan five of the seventy-two rows of the array of FIG.2(A) and thus indicates a break in any "vertical edge" previously detected, then the counter 138 is arranged to re-set the quasi-integrator circuit 134 to a zero condition (see below).

Referring to FIG.6(B), an alternative method of detecting a "vertical edge" V is to use three "points" $W_1$, $W_1'$ and B as indicated, the "points" $W_1$ and B being aligned in time, the point $W_1'$ being relatively ahead by the analogue delay-time of $T_E$, which may correspond to the scanning-interval between one or more rows of the array (FIG.2(A)).

The circuit for this detection is indicated in FIG.7(B) and is identical with FIG.7(A) except for the following. The line 129 is also connected to the 'A' input of a further bistate comparator 139 (similar to the comparator 131) to which the 'B' input is connected, via an analogue time-delay circuit 140 having the time-delay $T_E$ to the line 130. The outputs of the comparators 131 and 139 are respectively connected to the two inputs of an inclusive-OR gate 147 of which the output is supplied to the integrating circuit 132 as before. This circuit operates identically to FIG.7(A).

Referring to FIG.6(C), another method of detecting a "vertical edge" V which occurs "between" the outer two scanning lines S1 and S2 (corresponding to the columns 1 and 2, FIG.2(A) is to use five "points" B, $W_2$, $W_2'$, $W_4$ and $W_4'$ as indicated, the "points" B, $W_2$ and $W_4$ being aligned in time and corresponding to columns 1, 2 and 4 respectively of the array (FIG.2(A), and the "points" $W_2'$ and $W_4'$ being relatively ahead by the analogue delay-time of $T_E$ as before. (This arrangement has been found useful in connection with the recognition of the "hook"-symbol, 141 of FIG.6(D) of the OCR 'A' font, where the nominally "white" spaces 142, 143 of the symbol tend to become printed "black" as indicated for the space 142).

The circuit for this detection is indicated in FIG.7(C) and is identical with FIG.7(B) except for the following. The sampling lines A,B and D are connected respectively to three input lines 144, 145 and 146. The line 144 is connected to the 'A' input of each of four two-input bi-state comparators 147–150 inclusive, each as above. The lines 145 and 146 are connected, firstly, respectively and directly to the 'B' inputs of the comparators 147 and 149, and, secondly, respectively and in each case via one of two analogue time-delay circuits 151 and 152, to the 'B' inputs of the comparator 148 and 150. The outputs of the comparators 147–150 inclusive are respectively connected to the four inputs of an inclusive OR gate 153 of which the output is supplied, as before, to the integrating circuit 132.

Referring again to FIG. 6(C), a "vertical edge" V' which occurs "between" the other-side outer two scanning lines S5 and S4 is detected by using the mirror-image arrangement of the "points" B, $W_2$, $W_2'$, $W_4$ and $W_4'$. In this case, the detection circuit is identical with FIG. 7(C) except in that the lines 144, 145 and 146 are connected instead to the sampling lines E, D and B respectively.

Referring to FIG.6(E), a "vertical stroke" VS is shown as extending along the scanning line S2 : at its opposite sides it has "vertical edges" V1 and V2 which are respectively intercepted by "horizontal strokes" IH1 and IH2. Various detections of VS, V1 and V2 may be made by using three "points" $W_1$, B and $W_3$ as indicated, the "points" being aligned in time and corresponding to a trio of next-adjacent ones of the columns.

One relevant circuit for the purpose is indicated in FIG. 7(D). The sampling lines (e.g. A, B and C) associated with the just-mentioned trio of columns are respectively connected to three input lines 154, 155, and 156. The line 155 is connected to the 'A' inputs of each of two two-input bi-state comparators 157 and 158. The lines 154 and 156 are connected respectively to the 'B' inputs of the comparators 157 and 158. The outputs of the two comparators are respectively connected to the two inputs of an OR-gate 159 of which the output is supplied (as before) to the integrating circuit 132, and so on.

If the gate 159 is made to be an exclusive — OR gate, then the presence of a binary '1' signal on the output line 137 will indicate that one "vertical edge" (V1 or V2) has been recognised : the binary '1' will not appear for a "vertical stroke". If, however, the gate 159 is made to be an inclusive — OR gate, then that binary '1' will also appear in the case of a "vertical stroke".

FIG. 7 (E) is identical with FIG.7(D), except in that an AND-gate 160 is substituted for the OR-gate 159. This circuit thus recognises "vertical strokes" only.

Figure 8B:
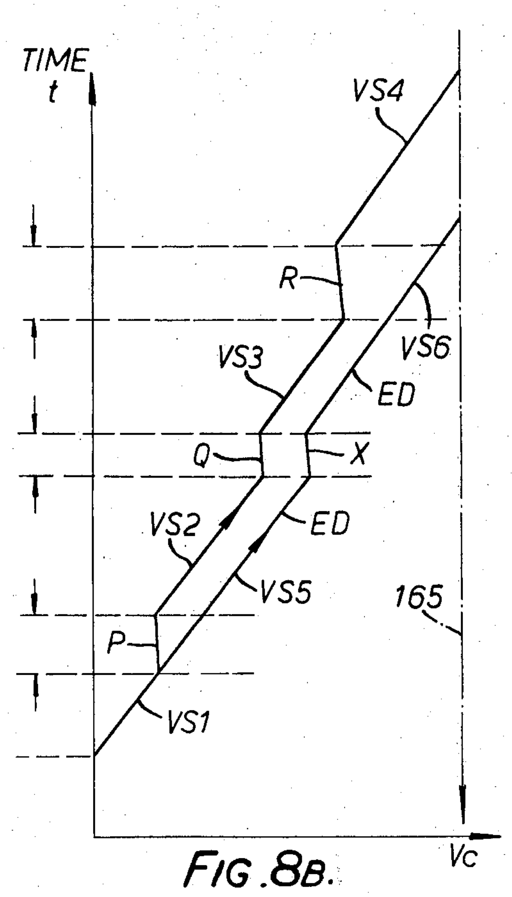
Figure 8C:
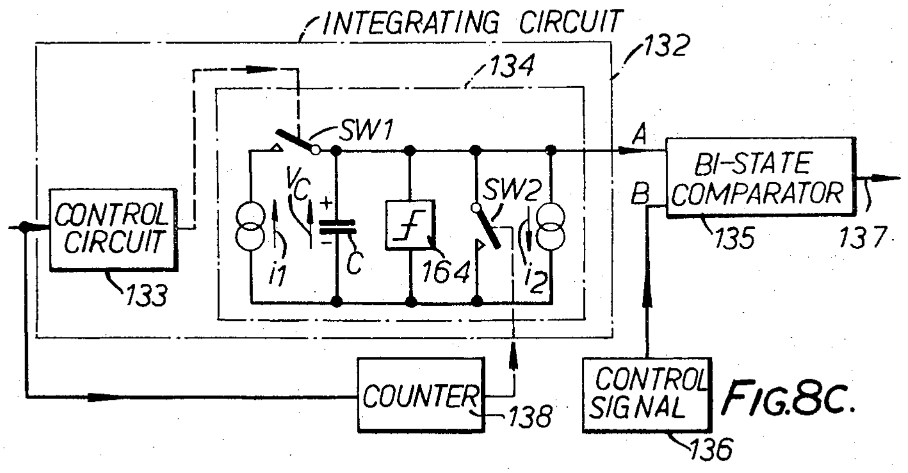

FIG. 8(C) illustrates one suitable arrangement of the integrating circuit 132 employed in FIGS. 7(A)–(E) inclusive.

FIG. 8(C) includes a circuit diagram of the quasi-integrating circuit 134 : in this circuit, the output signal (applied to the 'A' input of the comparator 135) is the voltage $V_C$ ( of the polarity indicated) which exists between the terminals of the capacitance C. This voltage $V_C$ tends to be increased linearly, while the switching-device SW1 is closed, by current supplied from a first constant-current generator $i_1$. Also, the voltage $V_c$ tends to be decreased linearly by current drawn-off by a second constant-current generator $i_2$ of relatively opposite polarity. The switching-device SW1 is controlled by the control circuit 133 such that SW1 remains closed so long as a binary '1' signal persists at the input to the control circuit 133 : thus, if that signal is interrupted corresponding to loss-of-fit (see below), the statistical weighting given to that loss-of-fit is determined by the ratio $(i_1 - i_2) : (i_2)$. The switching-device SW2 is controlled by the counter 138 in the manner described above (in connection with FIG.7(A), such that SW2 is closed, to re-set the circuit 134 to the zero condition by short-circuiting the capacitance C, if a binary '0' signal persists at the input to the control circuit 133 for more than a predetermined time ( for example, the time taken by the scanning apparatus to scan five of the 72 rows of the array of FIG. 2(A)). The circuit 164, connected in parallel with the capacitance C, is a known zener-diode arrangement which acts as a voltage-limiter to maintain the voltage $V_C$ between selected upper and lower limits.

The operation of the circuit of FIG.8(C) is illustrated by FIGS. 8(A) and (B). FIG. 8(A) is similar to FIG.6(E). except in that the "vertical stroke" VS is interrupted by a "void" (a break) V0.

If, in the case of FIG. 8(A), the circuit of FIG.7(D) is employed, where the OR-gate 159 is an inclusive OR-gate and the circuit is employed to determine the accumulated length, in the direction 107 of the scanning, which may eventually amount to a "vertical stroke", then the voltage $V_C$(FIG.8(C)) rises linearly with time, as indicated by the sections VS1, VS5 and VS6 of the graph of FIG.8(B), the rise being interrupted only in the section X(corresponding to the void V0) where $V_C$ decreases linearly with time.

If, however, in the case of FIG.8(A), the circuit of FIG.7(E) is employed to determine the accumulated length which may eventually amount to a "vertical stroke", then the voltage $V_C$ rises linearly with time over the sections VS1, VS2, VS3 and VS4, and decreases linearly with time over the sections P,Q and R which correspond respectively to the "horizontal stroke" IH2, the void V0, and the "horizontal stroke" IH1.

In FIG. 8(B), the chain line 165 corresponds to the pre-set output-voltage of the control-signal circuit 136 (FIG.8(C)).

Referring to FIG. 9(A), the "lower" "Horizontal edge" (beneath a "horizontal stroke" of a character-feature) can be detected by using two sets of three "points" as indicated. The "points" $B_1$, $B_2$ and $B_3$ are aligned in time; the "points" $W_1$, $W_2$ and $W_3$ are also aligned in time and are located relatively ahead of the former "points" by the analogue delay-time of $T_E$ which may correspond to the scanning-interval between one or more rows of the array (FIG.2(A)).

The circuit for this detection is indicated in FIG.9(B): any three consecutive ones of the five sampling lines A,B,C D and E (but preferably the centre three lines B,C and D) are connected respectively to three input lines 170, 171 and 172. Each of these lines is connected to a separate corresponding input of the three-input minimum-signal-following circuit 173 of which the output is supplied, over a line 174, to the 'A' inputs of each of three two-input bi-state comparators 175,176 and 177 (each as above) of which the outputs are respectively connected to the three inputs of an inclusive — OR gate 178 of which the output is supplied to a line 179.

Also, each of the lines 170,171 and 172 is connected to the input of a separate corresponding analogue time-delay circuit (180,181,182) having the time-delay $T_E$. Three two-input maximum-signal-following circuits 183,184 and 185 are provided; the output of each of the delay circuits 180–182 inclusive is connected to one input of each of two of the circuits 183–185 inclusive, such that each such output is compared with each of the two other such outputs. The outputs of the circuits 183–185 inclusive are respectively supplied to the 'B' inputs of the comparators 177,176 and 175.

This circuit operates as follows (referring to FIGS9(A) and(B)). Suppose that, at the time $t_5$ when the "points" $W_1$, $W_2$ and $W_3$ are sampled (as described above), $W_1$ is partly covered (because of poor edge-definition of the character-feature) by a "black" region of the character-feature image, as indicated, $W_2$ indicates "black" (corresponding to the "vertical stroke" VI which intercepts the "lower" "horizontal edge" HL1), and $W_3$ indicates "white". Further, suppose that, at the later time $t_6$ when the "points" $B_1$, $B_2$ and $B_3$ are similarly sampled, $B_1$ and $B_3$ indicate "black" while $B_2$ detects a part of a void V0 (and so indicates something intermediate "black" and "white").

Firstly, the voltage output signals corresponding to the "points" $B_1$, $B_2$ and $B_3$, occurring at the time $t_6$, are compared in the minimum-signal-following circuit 173. Denoting the amplitudes of these three voltages by N,M and L respectively, then the operation of the circuit 173 is such that its output always corresponds to the least of L,M and N (if any two or more of L,M and N are equal, this remains true). Thus, the output signals from the circuit 173 always corresponds to the "least black" of the three "points" $B_1$, $B_2$ and $B_3$, i.e. to what may be conveniently described as the "whitest black-point" (in the present case, $B_2$).

Secondly, the voltage output signals corresponding to the "points" $W_1$, $W_2$, and $W_3$ are each separately delayed in the circuits 180–182 by the time $T_E$, so that the resulting signals effectively occur at the later time $t_5$ (at which time the signals of the preceding paragraph are generated). These signals corresponding to the "points" $W_1$, $W_2$ and $W_3$ are compared in pairs by the maximum-signal-following circuits 183–185. Denoting the amplitudes of the two voltages applied to the two inputs of any one such circuit 183–185 by G and H respectively, then the operation of each such circuit 183–185 is such that its output always corresponds to the greater of G and H (if they are equal, this remains true).

Thus, if any one of the three "points" $W_1$, $W_2$ and $W_3$ is "less white" than the other two (so that it is then the "least white" , i.e. it is the "blackest white-point"), then, of the three output-signals *a*, *b*, and *c* (FIG.9(B) of the three circuits 183–185, two of those will correspond to the said "blackest white-point"; ($W_2$ in the present case); the remaining one of the signals *a*, *b* and *c* must evidently correspond to the "blackest-but-one White-point" ($W_1$ in the present case). (The output-signal corresponding to the "whitest white-point", $W_3$ in the present case, is suppressed).

Thus, considering the comparators 175–177, each receives at its 'A' input the "lowest black" voltage corresponding to the "whitest black-point"; further, at least two of the comparators receive at their 'B' inputs, the "highest white" voltages corresponding to the "blackest white-point" while the third comparators may receive the "highest-but-one white voltage" corresponding to the "blackest-but-one white-point".

(If two of the "points" $W_1$, $W_2$ and $W_3$ are equally "less white" than the third, then the output signals *a*,*b* and *c* of all three of the circuits will correspond to the "blackest white-point", as will also (effectively) be the case if the output signals from each of the "points" $W_1$, $W_2$ and $W_3$ are all equal).

Thus, provided that the "whitest black-point" is "blacker" than the "blackest-but-one white-point", which is taken to be the criterion for the recognition of the "horizontal edge", then at least one of the comparators 175–177 will provide a binary '1' output signal which will be transmitted by the inclusive —OR gate 178 to the output line 179 to form the recognition signal (which may be passed on, as in the case of the output line 137 of FIG.7(A).

(It will be noted that, in FIG.9(B), the time-delay circuits 180–182 may instead be inserted at the outputs of the circuits 183–185, as indicated in the diagram at XXX. Moreover, other arrangements of time-delay circuits may be employed, provided that the signals from the six "points" can be compared at the comparators at the same effective time.)

In order to detect the converse case of FIG.9(A), an "upper" "horizontal edge" ("above" a "horizontal stroke" of a character-feature), the arrangement employed may be identical to that of FIG.9(A) but with the "points" $B_1$, $B_2$ and $B_3$ interchanged with the "points" $W_1$, $W_2$ and $W_3$.

The circuit for this latter detection is indicated in FIG.9(C) : it is identical with the circuit of FIG.9(B), except that the time-delay $T_E$ is applied instead to the "black-seeking points" $B_1$, $B_2$ and $B_3$, as by the three time-delay circuits 189, 190 and 191 (or, in a modification, a single similar time-delay circuit inserted at X in the output line 174 : again, here, similar remarks apply regarding the time-delay circuits). The operation of FIG. 9(C) is similar to that of FIG.9(B).

Referring to FIG.10(A), the "horizontal stroke" HS can be detected by using three sets of three "points" as indicated. The "points" of the set ($W_1'$, $W_2'$ and $W_3'$) are aligned at the time $t_7$, the "points" of the set ($B_1$, $B_2$ and $B_3$) are aligned at the time $t_8$, and the "points" of the set ($W_1$, $W_2$ and $W_3$) are aligned at the time $t_9$. The times $t_7$, $t_8$, and $t_9$ are increasingly later, by theanalogue time-delay of $T_S$ which may correspond to the scanning-interval between one or more rows of the array (FIG. 2(A)).

A circuit for this detection is indicated in FIG.10(B) ; any three consecutive ones of the five sampling lines A,B,C, D and E (but preferably the centre three lines B,C and D) are connected respectively to three input lines 192, 193 and 194.

Firstly, corresponding to the three "points" $B_1$, $B_2$ and $B_3$, each of the lines 192–194 is connected (via a separate corresponding one of three analogue time-delay circuits 195, 196 and 197) to a corresponding input of the three-input minimum-signal-following circuit 198 (similar to the circuit 173) of which the output is supplied, over a line 199, to the 'A' inputs of each of three two-input bi-state comparators 200,201 and 202 (as above) of which the outputs are supplied to the three inputs of an AND gate 203 of which the output is supplied to the output line 204.

Secondly, corresponding to the three "points" $W_1'$, $W_2'$ and $W_3'$, the outputs of each of the delay circuits 195–197 are supplied (respectively via the separate corresponding analogue time-delay circuits 200,201 and 202) respectively to the one inputs of three maximum-signal-following circuits 203,204 and 205.

(All of the time-delay circuits 195–197 and 200–202 have the same time-delay $T_S$.)

Thirdly, corresponding to the three "points" $W_1$, $W_2$ and $W_3$, the lines 192–194 are respectively connected to the other inputs of the three circuits 205,204 and 203.

The outputs of the circuits 203, 204 and 205 are respectively connected to the 'B' inputs of the comparators 202,201, and 200.

The operation of the circuit of FIG.10(B) is as follows. Suppose that, at the time $t_7$ when the "points" $W_1'$, $W_2'$ and $W_3'$ are sampled (as described above), $W_2'$ is partly covered by a "black" region of the character-feature image, as indicated, while $W_2'$ and $W_3'$ indicate "white". Also, suppose that, at the later time $t_8$ when the "points" $B_1$, $B_2$ and $B_3$ are sampled, $B_1$ and $B_2$ indicate "black" while $B_3$ detects a part of a void V0 (and so indicates something intermediate "black" and "white"). Further, suppose that, at the still-later time $t_9$ when the "points" $W_1$, $W_2$ and $W_3$ are sampled, $W_1$ and $W_2$ indicate "white" while $W_3$ indicates "black" (corresponding to the "vertical stroke" VI which intercepts the "horizontal stroke" HS).

Firstly, the output of the minimum-signal-following circuit 198 will correspond, as in the case of FIGS.9(A) and (B), to the "least black" of the three "points" $B_1$, $B_2$ and $B_3$, i.e. to the "whitest black-point" (in the present case, $B_3$).

Secondly, the maximum-signal-following circuits 203, 204, and 205 will act, similarly to the case of FIGS.9(A) and (B), to determine respectively the "less-white" of the two "points" $W_1$ and $W_3'$, the "less white" of the two "points" $W_2$ and $W_2'$, and the "less white" of the two points $W_3$ and $W_1'$. The output signals $d$, $e$ and $f$ respectively of the circuits 203–205 will respectively correspond to these three "less white" "points", and one of the signals $d$, $e$ and $f$ must evidently correspond to the "least white" of the six points $W_1$, $W_2$, $W_3$ , $W1'$, $W_2'$ and $W_3$ ' ( in the present case, the "point" $W_3$) : this point is the "blackest white-point".

Thus, considering the comparators 200–202, each receives at its 'A' input a voltage corresponding to the "whitest black-point", and the comparators respectively receive at their 'B' inputs, voltages corresponding respectively to the said three "less white" "points". Thus, provided that the "whitest black-point" is "blacker" than at least one of the said three "less white" "points", then at least one of the comparators will provide a binary '1' output signal which will be transmitted by the inclusive —OR gate 203 to the output line 204 to form the recognition signal (which may be passed on, as in the case of the output line 137 of FIG.7(A))

It should be noted that the "points" $W_1$, $W_2$ and $W_3$ of the one set of "white-seeking points" may be compared, one with another, with the "points" $W_1'$,.$W_2'$ and $W_3'$ of the other set, in a manner different from that employed in FIG.10(B) wherein the comparison is $W_1 - W_3$, $W_2 - W_2'$, and $W_3$–$W_1'$ : the modification is effected by selecting a different arrangement of the inputs to the circuits 203,204 and 205.

Similarly to the circuits of FIGS.9(B) and (C), the circuit of FIG.10(B) may include different arrangements of the time-delay circuits from that described, provided that the signals can be compared at the same effective time, One such arrangement is shown in FIG.10(C) which is identical to FIG.10(B) except that the signals to the 'H' inputs of the circuits 203, 204 and 205 are, instead, derived respectively from the lines 192, 193 and 194 by way of the respective analogue time-delay circuits 210, 211 and 212 of which the time-delay is equal to $2T_E$.

In connection with the circuits of FIGS. 9(B), 9(C), 10(B) and 10(C), it is to be understood that the minimum-signal-following and maximum-signal-following circuits are selected on the assumption (see FIG.4(B)) that "black" and "white" correspond respectively to relatively higher and relatively lower voltages on the sampling lines A,B,C,D and E; if the converse is true, the maximum-signal-following circuits should be substituted for the minimum-signal-following circuits, and vice versa. (The maximum-and minimum-signal-following circuits are conveniently of the general form described in our British patent specification No.34242/68, acceptance number 1,268,359, but any suitable circuits may be employed.)

It is further to be understood that the image-receiving surface 104 (FIGS.1,2) may be scanned differently from the manner described. In particular, by employing suitable memory-devices, the in-phase scanning (FIG.3) of all of the columns, may be departed from.

What we claim is:

1. Optical character recognition apparatus comprising a two dimensional array of light detecting elements arranged in a plurality of rows and a plurality of columns, on to which array a pattern corresponding to a character to be recognised is displayed, a plurality of output conductors, one output conductor being associated with each column of said elements, and scanning means for causing the rows of said elements to be successively scanned whereby an electrical signal is afforded by each of the output conductors, the instantaneous amplitude of which is dependent upon the amount of light falling on the light detecting element associated with that conductor at the instant of scanning, and analogue comparator means including bi-state comparator means associated with the output conductors of two of the columns of the array, integrator means operable on the output of the bi-state comparator means for affording an output which increases in response to a predetermined output from said comparator means, reset means for causing the integrator means to be reset in response to a second predetermined output from said comparator means and further bi-state comparator means for comparing the output of the integrator means with a reference signal and for affording an output indicative of the existence of an edge feature of a character displayed on said array, the edge feature being substantially parallel to the columns of said array.

2. Optical character recognition apparatus comprising a two dimensional array of light detecting elements arranged in a plurality of rows and in a plurality of columns, in to which array a pattern corresponding to a character to be recognised is displayed, a plurality of output conductors, one output conductor being associated with each column of said elements, and scanning means for causing the rows of said elements to be successively scanned whereby an electrical signal is afforded by each of the output conductors, the instantaneous amplitude of which is dependent upon the amount of light falling on the light detecting element associated with that conductor at the instant of scanning, and analogue comparator means including first bi-state comparator means associated with the output conductors of two of the columns of the array, integrator means operable on the output of the first bi-state comparator means and second bi-state comparator means for comparing the output of the integrator means with a reference signal and for affording an output indicative of the existence of an edge feature of a character displayed on said array, the edge feature being substantially parallel to the columns of said array, the first bi-state comparator means comprising first and second bi-state comparators each having two inputs and an output, the inputs of each of the bi-state comparators being associated respectively with the output conductors of two adjacent columns of the array, delay means connected in series with one of the inputs of one of the bi-state comparators, and gating means to which the outputs of the first and second bi-state comparators are applied for affording an output to the integrator means.

3. Apparatus according to claim 2, in which the gating means takes the form of an "OR" gate.

4. Optical character recognition apparatus comprising a two dimensional array of light detecting elements arranged in a plurality of rows and a plurality of columns, on to which array a pattern corresponding to a character to be recognised is displayed, a plurality of output conductors, one output conductor being associated with each column of said elements, and scanning means for causing the rows of said elements to be successively scanned whereby an electrical signal is afforded by each of the output conductors, the instantaneous amplitude of which is dependent upon the amount of light falling on the light detecting elements associated with that conductor at the instant of scanning, and analogue comparator means including first bi-state comparator means associated with the output conductors of three of the columns of the array, integrator means operable on the output of the first bi-state comparator means, and second bi-state comparator means for comparing the output of the integrator means with the reference signal and for affording an output indicative of the existence of an edge feature of the character displayed on said array the edge feature being substantially parallel to the columns of said array, the first bi-state comparator means comprising first and second bi-state comparators each having two inputs and an output, the inputs of one of the bi-state comparators being connected to the output conductors of two adjacent columns of the array and the inputs of the other bi-state comparator being connected to one of the output conductors of the said two adjacent columns and to the output conductor of a third column that is adjacent thereto, and gating means to which the output of the bi-state comparators are fed for affording an output to the integrator means.

5. Apparatus according to claim 4, in which the gating means takes the form of an "OR" gate.

6. Apparatus according to claim 4, in which the gating means takes the form of an "AND" gate.

7. Optical character recognition apparatus comprising a two dimensional array of light detecting elements arranged in a plurality of rows and a plurality of columns, on to which array a pattern corresponding to a character to be recognised is displayed, a plurality of output conductors, one output conductor being associated with each column of said elements and scanning means for causing the rows of said elements to be successively scanned whereby an electrical signal is afforded by each of the output conductors, the instantaneous amplitude of which is dependent upon the amount of light falling on the light detecting element associated with that conductor at the instant of scanning, and analogue comparator means including first bi-state comparator means associated with the output conductors of three of the columns of the array, integrator means operable on the output of the first bi-state comparator means, and second bi-state comparator means for comparing the output of the integrator means with a reference signal and for affording an output indicative of the existence of an edge feature of a character displayed on said array, the edge feature being substantially parallel to the columns of the array, the first bi-state comparator means comprising first, second, third and fourth bi-state comparators each having two inputs and an output, one output of the bi-state comparators being connected to the output conductor of one column of the array, the other input of the first bi-state comparator being connected to the output conductor of a second column of said array, the said second column being adjacent the said one column, and the other input of the third bi-state comparator being connected to the output conductor of a third column of the array, the said third column being spaced from the said one column by two columns and spaced from the said second column by one column, first delay means being provided for connecting the output conductor of the said second column to the other input of the second bi-state comparator and second delay means being provided for connecting the output conductor of the said third conductor to the other input of the fourth bi-state comparator, gating means also being provided to which the outputs of the bi-state comparators are connected for affording an output to the integrator means.

8. Apparatus according to claim 7, in which the gating means takes the form of an "OR" gate.

9. An optical character recognition apparatus comprising a two dimensional array of light detecting elements arranged in a plurality of rows and a plurality of columns, on to which array a pattern corresponding to a character to be recognised is displayed, a plurality of output conductors, one output conductor being associated with each column of said elements and scanning means for causing the rows of said elements to be successively scanned whereby an electrical signal is afforded by each of the output conductors, the instantaneous amplitude of which is dependent upon the amount of light falling on the light detecting element associated with that conductor at the instant of scanning, and analogue comparator means associated with the output conductors of three columns of said array, the analogue comparator means comprising minimum follow circuit means to which the output conductors are connected, delay means individually associated with each of the output conductors, first, second and third maximum follow circuit means each having two inputs and an output, the outputs of the delay means being associated in pairs and connected to a respective one of the said maximum follow circuit means, first, second and third bi-state comparators means each having two inputs and one output, an output of the minimum follow circuit means being connected to one input of each of said comparators, the other input of each of said comparators being connected to the output of a respective one of said maximum follow circuit means, and gating means to which the output of said comparators are connected, the gating means affording an output indicative of the existence of an edge feature of a character displayed on said array, the edge feature being substantially parallel to the rows of said array.

10. Apparatus according to claim 9, in which the gating means takes the form of an "OR" gate.

11. Optical character recognition apparatus comprising a two dimensional array of light detecting elements arranged in a plurality of rows and a plurality of columns, on to which array a pattern corresponding to a character to be recognised if displayed, a plurality of output conductors, one output conductor being associated with each column of said elements and scanning means for causing the rows of said elements to be successively scanned, whereby an electrical signal is afforded by each of the output conductors, the instantaneous amplitude of which is dependent upon the amount of light falling on the light detecting element associated with that conductor at the instant of scanning, and analogue comparator means associated with three of the columns of the array, the analogue comparator means comprising a minimum follow circuit means having three inputs and an output, delay means individually associated with each of the output conductors for connecting the output conductor to one of the inputs of said minimum circuit follow means, first, second and third maximum follow circuit means each having two inputs and an output, the inputs of each of the maximum follow circuit means being connected to a different pair of the three said output conductors, first, second and third bi-state comparators each having two inputs and an output, the output of the minimum follow circuit means being connected to one input of each of said comparators, and the other input of each of said comparators being connected to the output of a respective one of said maximum follow circuit means, and gating means to which the outputs of said comparators are connected, the gating means affording an output indicative of the existence of an edge feature of a character displayed on said array, the edge feature being substantially parallel to the rows of said array.

12. Apparatus according to claim 11, in which the gating means takes the form of an "OR" gate.

13. Optical character recognition apparatus comprising a two dimensional array of light detecting elements arranged in a plurality of rows and a plurality of columns, on to which array a pattern corresponding to a character to be recognised is displayed, a plurality of output conductors, one output conductor being associated with each column of said elements and scanning means for causing the rows of said elements to be successively scanned whereby an electrical signal is afforded by each of the output conductors, the instantaneous amplitude of which is dependent upon the amount of light falling on the light detecting element associated with that conductor at the instant of scanning, and analogue comparator means associated with three columns of the array, the analogue comparator means comprising minimum follow circuit means having three inputs and an output, delay means individually associated with each of the output conductors of said three columns for connecting the output conductors to the inputs of said minimum follow circuit means, first, second and third maximum follow circuit means each having two inputs and an output, one of the three said output conductors being connected to one input of a respective one of the said maximum follow circuit means, further delay means individually associated with each of said delay means for connecting the outputs thereof to the other input of a respective one of said maximum follow circuit means, first, second and third bi-state comparators each having two inputs and an output the output of the minimum follow circuit means being connected to one input of each of said comparators and the other input of each of said comparators being connected to the output of a respective one of said maximum follow circuit means, and gating means to which the outputs of said comparators are connected, the gating means affording an output indicative of the existence of an edge feature of a character displayed on said array, the edge feature being substantially parallel to the rows of said array.

14. Apparatus according to claims 13, in which the gating means takes the forms of an "OR" gate.

15. Apparatus according to claim 14, in which the delay duration of the delay means and the further delay means are equal.

16. Optical character recognition apparatus comprising a two dimensional array of light detecting elements arranged in a plurality of rows and a plurality of columns, on to which array a pattern corresponding to a character to be recognised is displayed, a plurality of output conductors, one output conductor being associated with each column of said elements, and scanning means for causing the rows of said elements to be successively scanned whereby an electrical signal is afforded by each of the output conductors, the instantaneous amplitude of which is dependent upon the amount of light falling on the light detecting element associated with that conductor at the instant of scanning, and analogue comparator means associated with three columns of the array, the analogue comparator means comprising minimum follow circuit means having three inputs and an output, delay means individually associated with each of the output conductors of said three columns for connecting the output conductors to the inputs of said minimum follow circuit means, first, second and third maximum follow circuit means each having two inputs and an output, each of the three said output conductors being connected to one input of a respective one of the said maximum follow circuit means, further delay means individually associated with each of said output conductors the further delay means being effective for connecting each of the output conductors to the other input of a respective one of the said maximum follow circuit means, first, second and third bi-state comparators each having two inputs and an output, the output of the minimum follow circuit means being connected to one input of each of said bi-state comparators and the other input of each of said comparators being connected to the output of a respective one of said maximum follow circuit means, and gating means to which the outputs of the said comparators are connected, the gating means affording an output indicative of the existence of an edge feature of a character displayed on said array, the edge feature being substantially parallel to the rows of said array.

17. Apparatus according to claim 16, in which the gating means takes the form of an "OR" gate.

18. Apparatus according to claim 17, in which the delay duration of the further delay means is twice that of the delay means.

* * * * *